Figure 1:
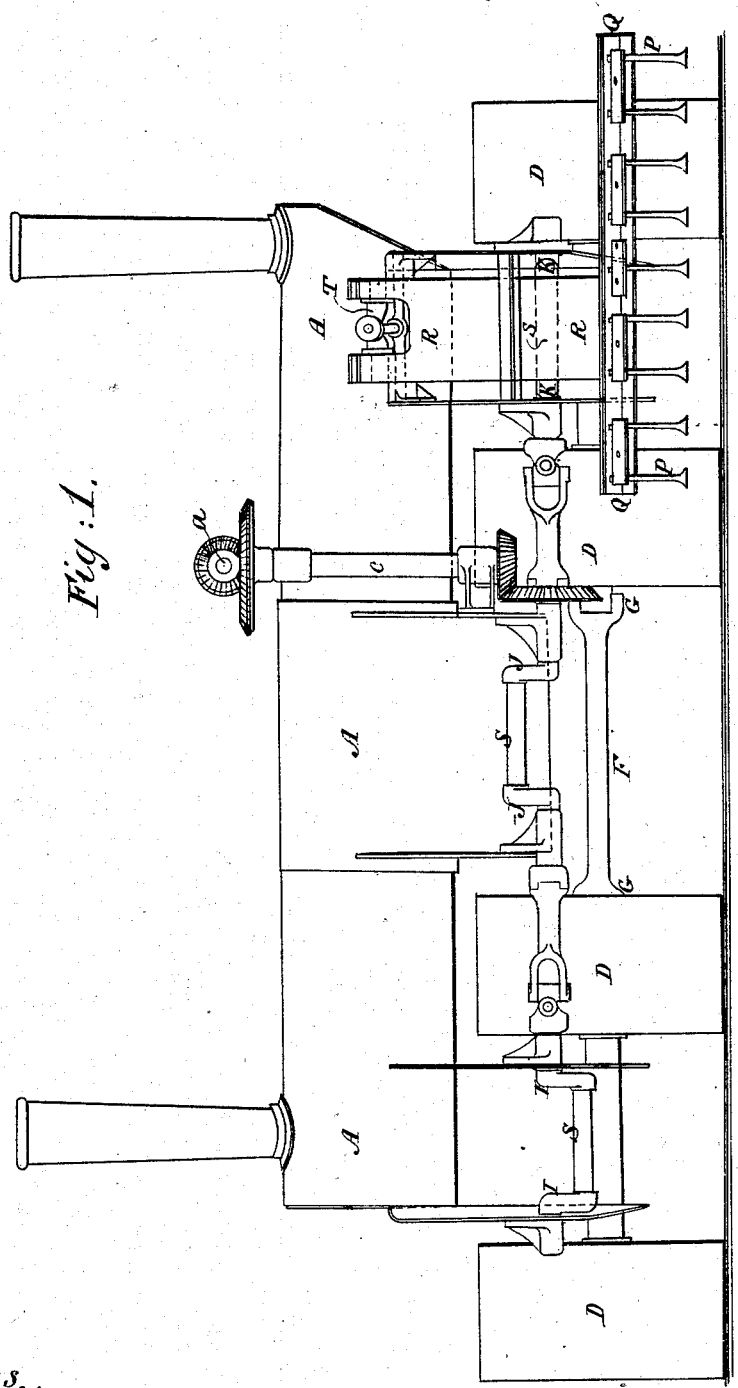

(No Model.) 8 Sheets—Sheet 1.

T. C. DARBY.
DIGGING MACHINE.

No. 276,783. Patented May 1, 1883.

Witnesses
Lloyd B. Wight
James Young.

Inventor:
Thomas C. Darby,
By his attorneys
Baldwin, Hopkins & Payton.

(No Model.) 8 Sheets—Sheet 2.

T. C. DARBY.
DIGGING MACHINE.

No. 276,783. Patented May 1, 1883.

Witnesses.
L. P. Elwell.
Chas. E. Upperman

Inventor.
Thos. C. Darby
by his attys
Baldwin, Hopkins & Peyton (No Model.)  8 Sheets—Sheet 5.

T. C. DARBY.
DIGGING MACHINE.

No. 276,783.  Patented May 1, 1883.

(No Model.)  8 Sheets—Sheet 7.

T. C. DARBY.
DIGGING MACHINE.

No. 276,783.  Patented May 1, 1883.

Witnesses.
Lloyd B. Wight
James Young.

Inventor:
Thomas C. Darby,
By his attorneys
Baldwin, Hopkins & Peyton.

(No Model.) 8 Sheets—Sheet 8.

T. C. DARBY.
DIGGING MACHINE.

No. 276,783. Patented May 1, 1883.

UNITED STATES PATENT OFFICE.

THOMAS C. DARBY, OF PLESHEY LODGE, NEAR CHELMSFORD, COUNTY OF ESSEX, ENGLAND.

DIGGING-MACHINE.

SPECIFICATION forming part of Letters Patent No. 276,783, dated May 1, 1883.

Application filed May 17, 1881. (No model.) Patented in England May 5, 1879, No. 1,773.

*To all whom it may concern:*

Be it known that I, THOMAS CHURCHMAN DARBY, a subject of the Queen of Great Britain, residing at Pleshey Lodge, near Chelmsford, in the county of Essex, England, have invented certain new and useful Improvements in Digging-Machines, (that part of the invention described and claimed in the following specification having been patented to me in England by Letters Patent dated May 5, 1879, No. 1,773,) of which the following is a specification.

In the specification of a former patent granted to me, No. 225,692, dated March 23, 1880, I described a digging-machine in which a number of digging-tools were mounted along one of the longer sides of the implement, and this machine, when at work, was caused to move sidewise over the land. The object of my present invention is mainly to admit of digging-machines which are provided with digging-tools along one of their longer sides being readily moved endwise when the machine is to be moved from place to place. I effect this object in the following manner: I support the body of the machine upon two locking or pivoting carriages, one near each of its ends. Below the central vertical pivot of each locking-carriage is a horizontal axle with a broad supporting-wheel on each of its ends. The horizontal axle of one locking-carriage is driven from the crank-shaft of the engine by means of a vertical shaft carried down through the central vertical pivot upon which the carriage locks or swivels. Each wheel is loose upon its axle, but can be clutched to it. When the machine is at work digging, the axles of both locking-carriages are set so as to be in a line with one another and parallel with the length of the machine, and they are coupled to one another by an intermediate length of shafting, so that when the one axle is driven the other shall turn also; or both axles might, if preferred, be driven from the crank-shaft of the engine by gearing carried down through the vertical pivots of the locking-carriages, instead of one of the axles only being thus driven. If all the wheels are clutched to their axles, the machine will travel sidewise in a straight line over the land, and be propelled by all the wheels; or if the wheels at one end of the machine are allowed to run loose upon their axle the machine will turn round in a circle. The digging-tools are ranged along one side of the machine, and on the opposite side an arm extends out horizontally and carries a wheel or wheels which serve to keep the machine erect when at work digging. These wheels may also be made to serve as steerage-wheels.

When the machine is not at work, but is to be moved from one place to another, the axles of the locking-carriages are disconnected one from the other, and the locking-carriages are each made to make a quarter-turn, so as to bring the wheels in position to allow the machine to travel end foremost instead of sidewise. The projecting arm above mentioned, and the wheel or wheels carried by it, can then be removed or turned upward or downward or to one side, so as to be out of the way. The machine when traveling endwise is propelled only by the pair of wheels on the axle which is driven continuously from the crank-shaft of the engine. The other pair of wheels on the other axle may then be used as steerage-wheels.

The digging-tools I divide into three sets. One set (the central one) I carry from the central part of the body of the machine. The end sets I carry, one by one of the locking-carriages and the other by the other locking-carriage; or all the digging-tools might be carried by the body of the implement, but not, I believe, so advantageously. The digging-tools are fixed to the lower ends of levers which at their centers are carried by the cranks of a crank-driving shaft. The upper ends of the levers are by interposed springs coupled to links which control their movement; or this may be reversed and the cranks be made to act upon the upper ends of the levers, while the fulcrums of the levers are carried by the links, and are similarly connected to them by interposed springs.

The above improvements are shown in the drawings hereunto annexed.

Figure 2:
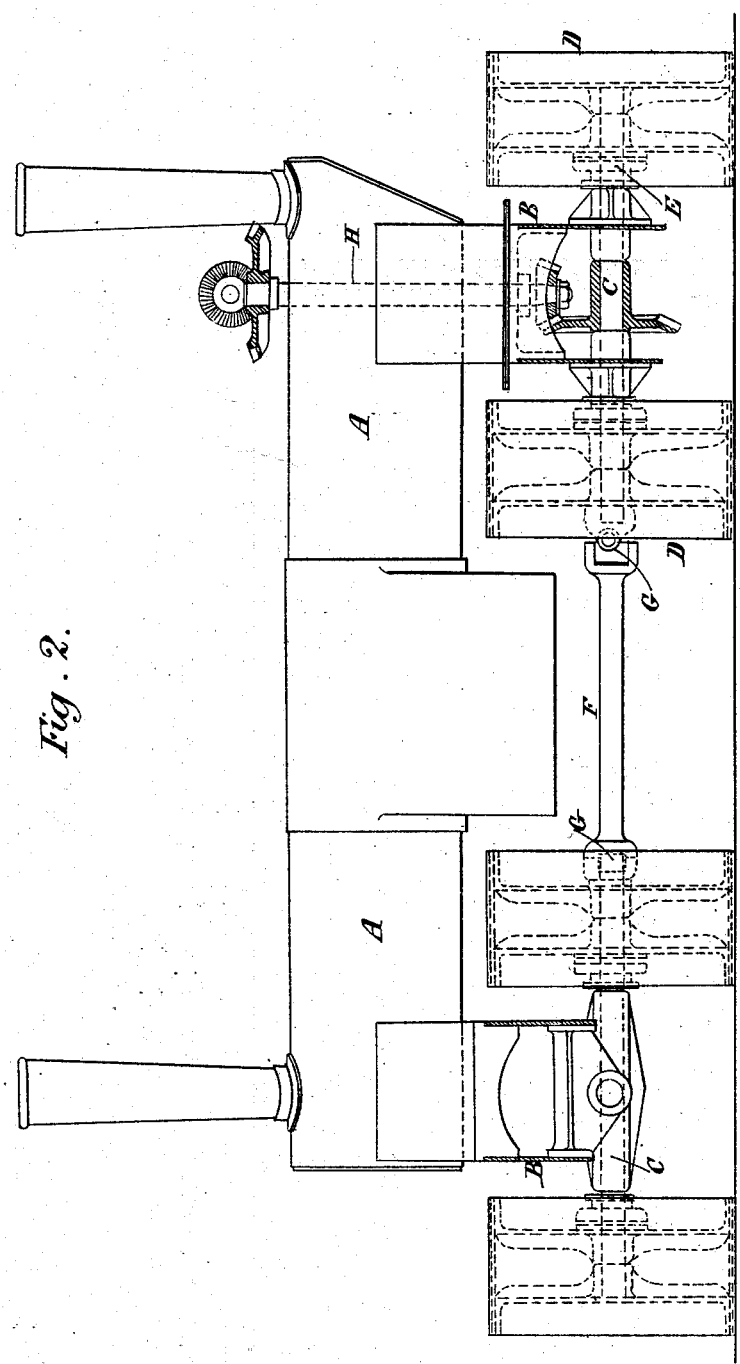
Figure 3:
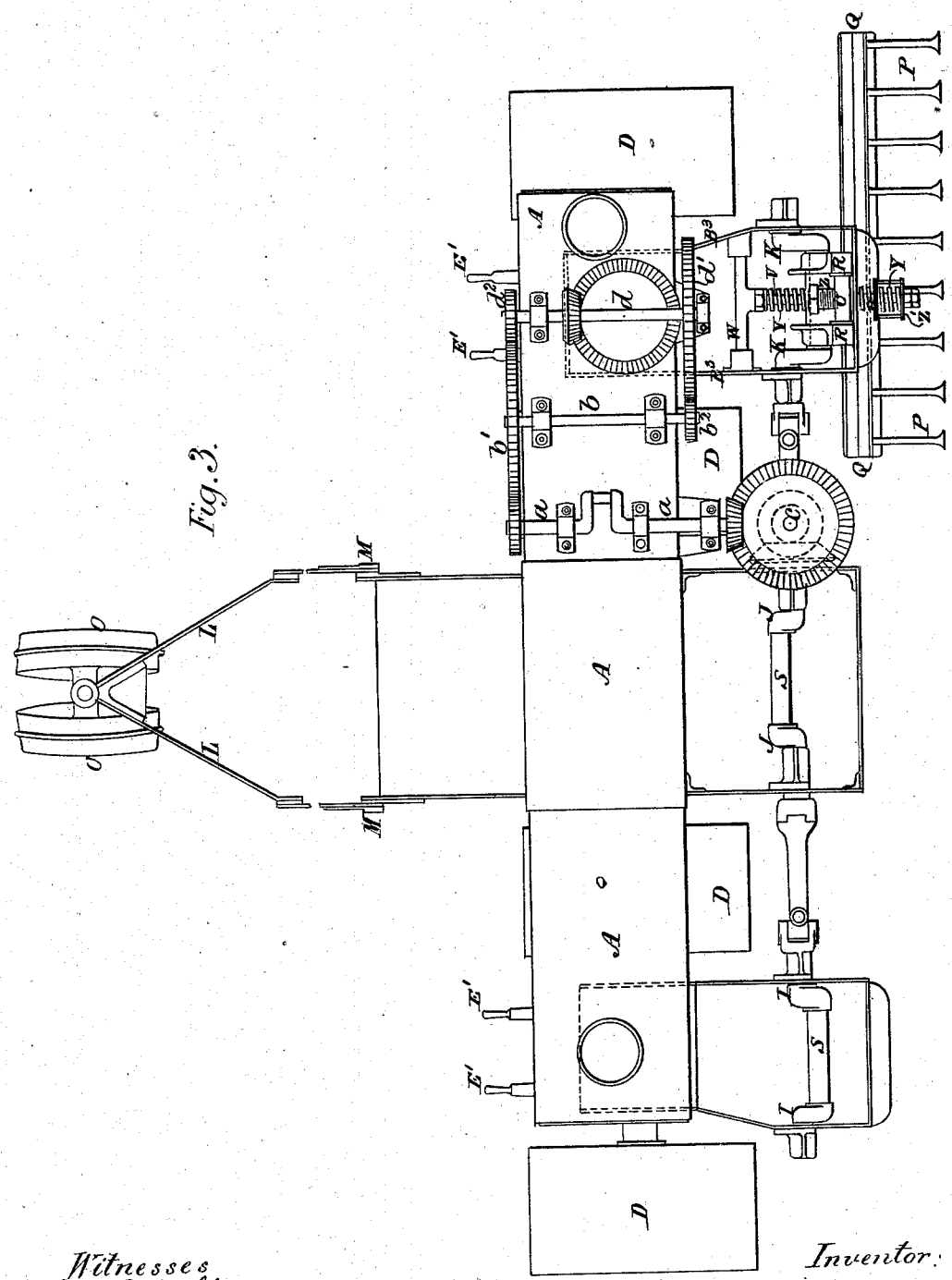
Figure 4:
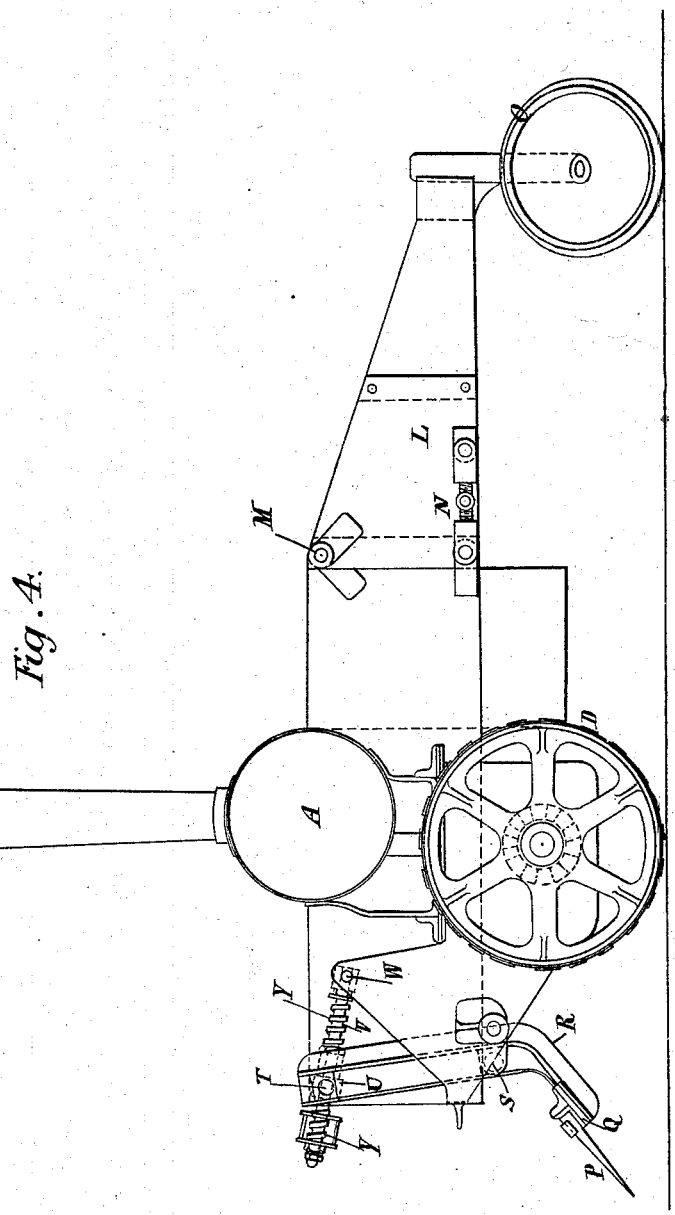
Figure 5:
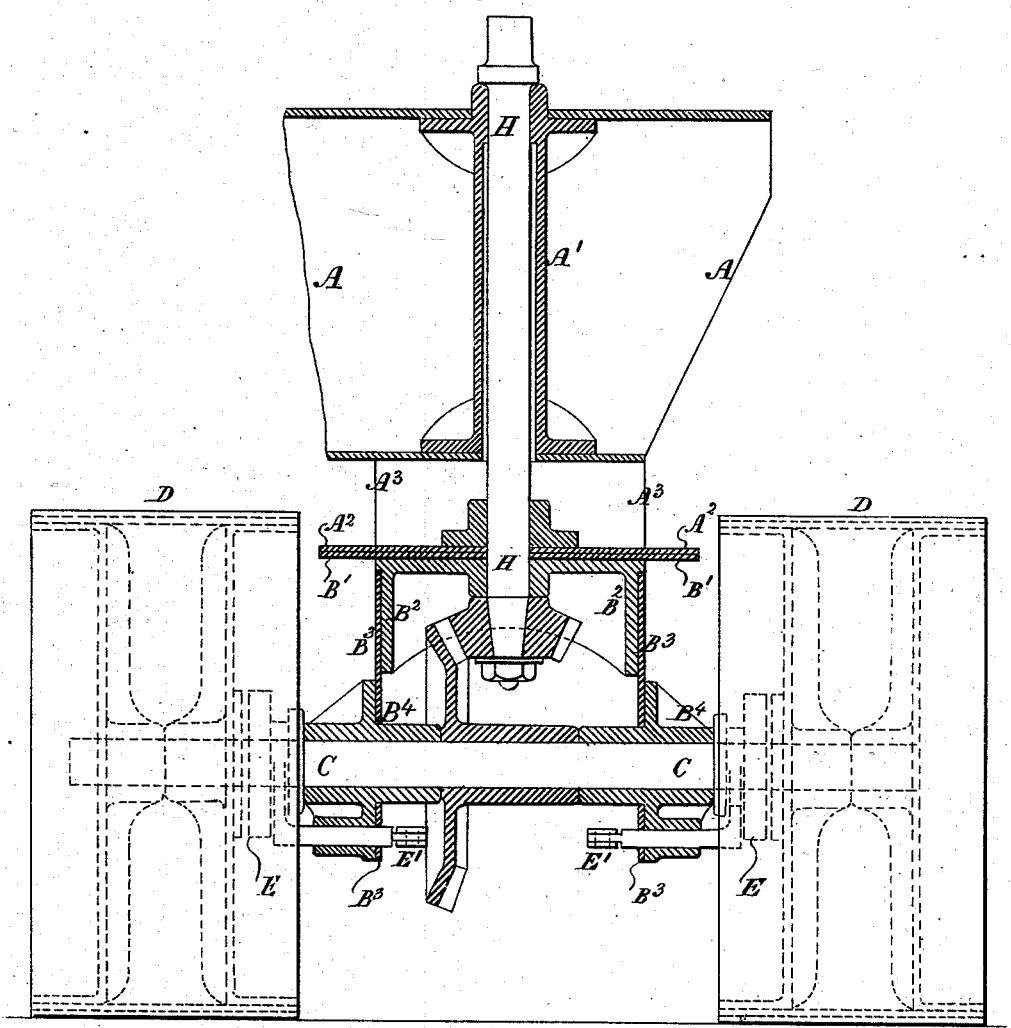
Figure 6:
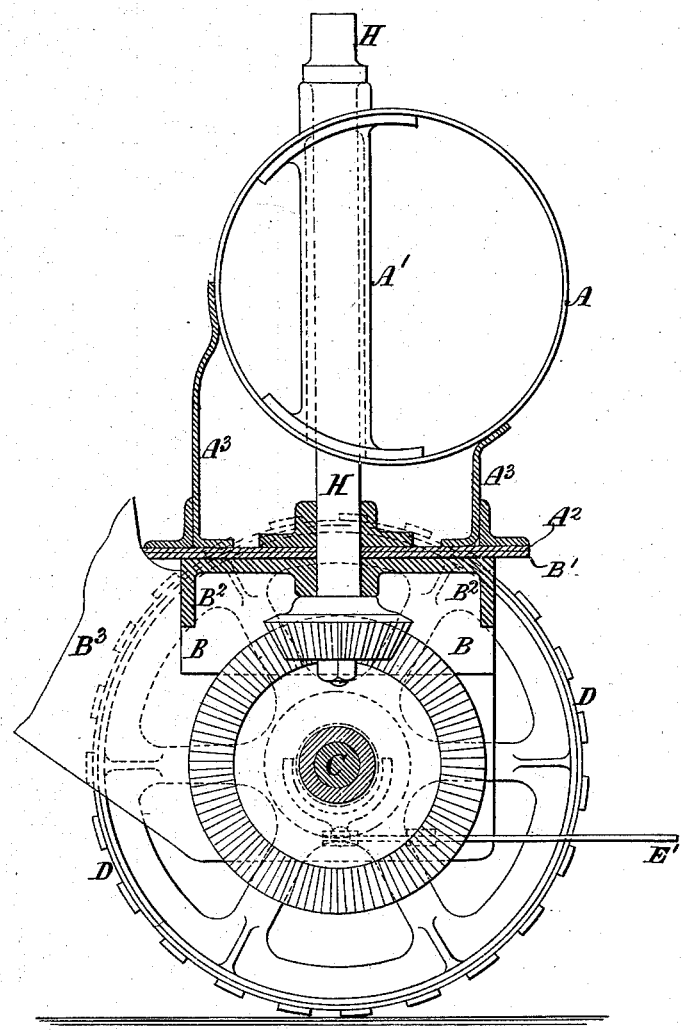
Figure 7:
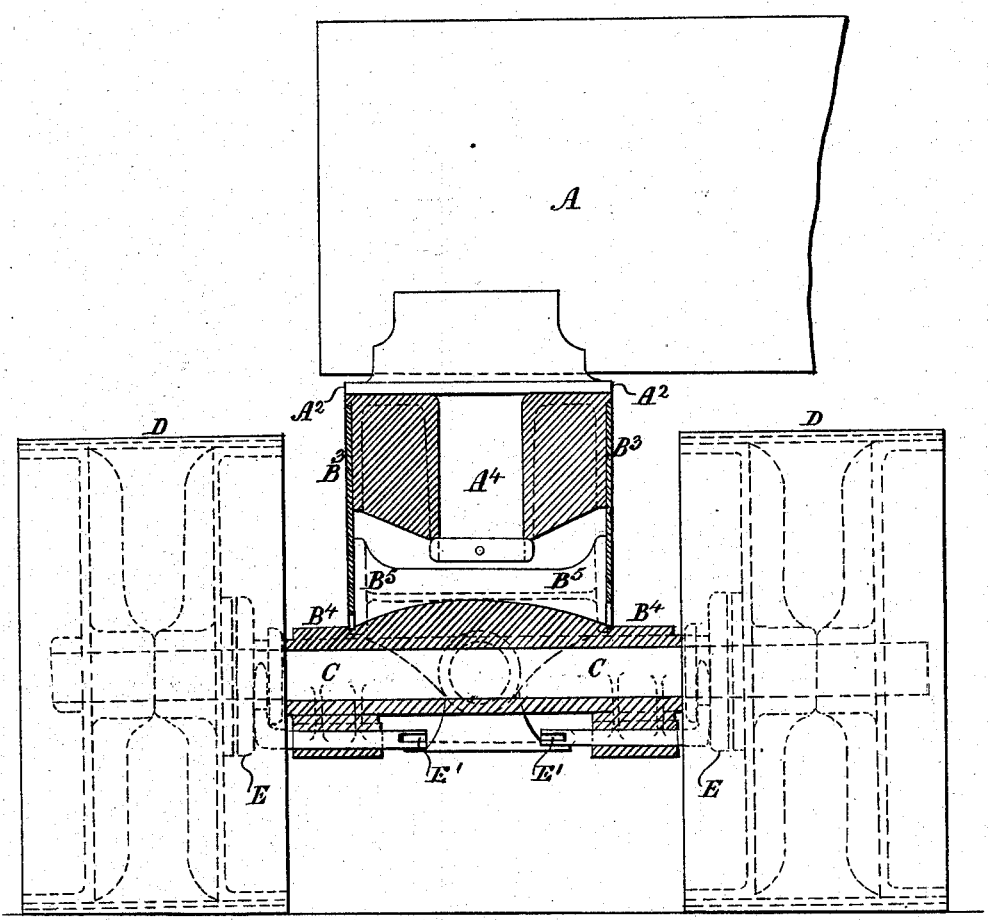
Figure 8:
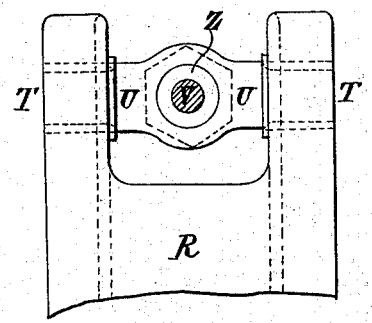
Figure 9:
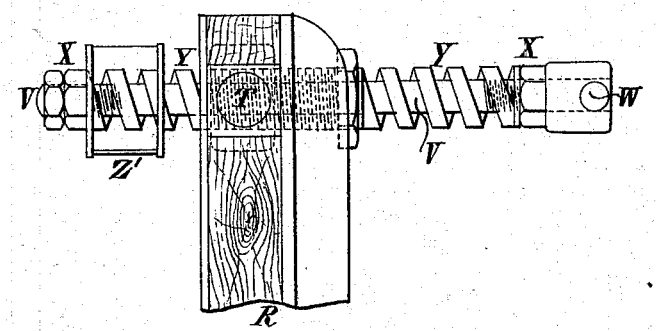
Figure 10:
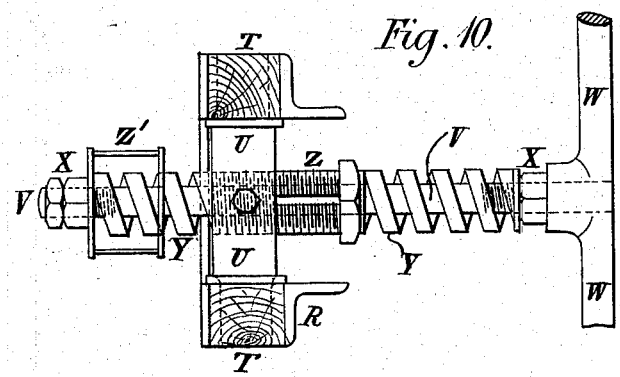

Figure 1 is a side elevation, with some of the parts removed, of a digging-machine constructed as above described. It shows the cranked axis by which the digging-tools are carried and the way in which this axis is supported and driven. One set of digging-tools only is shown in this figure. The two other sets are of the same construction. Fig. 2 shows another side elevation with the crank-axis and digging-tools removed, but showing the way in which motion is transmitted to the axles of the supporting-wheels. Fig. 3 is a plan view, showing the way in which the supporting-wheels and digging-tools are driven. One set only of digging-tools is shown. The other two sets are just of the same construction. Fig. 4 is a part end view, showing the arm and steadying and steering wheels used when the machine is at work. Figs. 5 and 6 show vertical sections of the end locking-carriage, through the vertical pivot of which motion is transmitted to the wheels. Fig. 7 is a vertical section through the other locking-carriage. Figs. 8, 9, and 10 show details of parts of the digging mechanism.

A is a steam-boiler formed with a central fire-box and chimney at each end.

B B are locking-carriages, one under each end of the boiler. C C are horizontal axles mounted in bearings in these carriages, so that they can be revolved. D D are broad wheels capable of turning freely around the ends of these axles.

E E are clutches by which any one or other of the wheels D can be made fast with its axle. These clutches can be moved to and fro to clutch and unclutch the wheels by levers.

F is a coupling-link coupled by universal joints G to the ends of both axles C.

H is a vertical axis passing down through the center of the vertical pivot of one of the locking-carriages. This vertical axis is, as shown, driven from the crank-shaft of a steam-engine which is mounted upon the top of the boiler.

I J K are three parts of a crank-axis used for giving motion to the digging-tools. The two parts I and K are carried respectively by the frames of the two end locking-carriages, while the central part, J, is carried by projections that stand out from the body of the machine. The three lengths are coupled together by universal joints while the machine is at work digging, and the central length is driven from the crank-shaft of the engine, as shown. When the machine is to be caused to travel endwise the three parts I J K of the crank-axis are uncoupled from one another, and the locking-carriages are each caused to make a quarter-turn, the end parts, I K, of the shaft being carried round along with the locking-carriages.

L is an arm extending horizontally from the center of the body of the machine on the opposite side to that which carries the digging-tools. It is capable of being turned upward on a joint, M, when out of use, but at other times is locked and prevented from turning upward by a screw-coupling, N. (See Fig. 4.)

O is a wheel or wheels at the end of the arm L. The wheel or wheels may be used for steering the machine when at work digging.

P P are the digging forks or spades. They are fixed to horizontal bars Q, which are carried by the lower ends of levers R. These levers are carried by and can turn upon the crank-pins S of the cranks on the three parts of the crank-axis, I J K. Through the upper end of the lever-arms passes a pivot, T, at the center of which is a block, U. A rod, V, which can turn on a fixed pivot at W, passes through this block, and near each end carries a nut, X. Coiled springs Y, which surround the rod V, are interposed between the block U and the nuts X.

Z is a hollow screw-bolt, which can slide freely along the rod V. By screwing the bolt Z more or less into the block U the relative compression of the two springs Y at either end of it can be adjusted.

Z' is a stop to limit the extent to which the outer spring can be compressed.

The construction of one end locking-carriage is shown at Figs. 5 and 6 and of the other at Fig. 7.

In Figs. 5 and 6, A' is a tube carried through from top to bottom of the boiler. $A^2$ is a flat horizontal plate secured to the bottom of the boiler by two vertical plates, $A^3$. The horizontal plate $A^2$ rests upon the top of a plate, B', fixed above the top of a square casting, $B^2$. The shaft H passes down through the tube A' and through the center of the plates $A^2$ B' and casting $B^2$, and serves as a pivot for the casting $B^2$ and plate B' to turn around. $B^3$ are two wrought-iron plates attached to two opposite sides of the casting $B^2$. They have fixed to them bearings $B^4$ for the axle C to turn in, as shown at Fig. 5. They are also extended outward away from the axle to carry the digging apparatus, as shown at Figs. 1, 3, and 4. The wheels D are free to turn upon the axle, but can be locked to it by the sliding clutches E. The clutches can be slid endwise along the shaft C by levers E', the fulcrums of which are carried by the plates $B^3$, as shown at Fig. 6.

In the construction of the locking-carriage shown at Fig. 7 the locking-carriage turns upon a strong pin, $A^4$, projecting downward from the center of the plate $A^2$. The two plates $B^3$ are secured to a casting, $B^5$. The bearing $B^4$ for the axle C has pins projecting from either side of it. These are received in bearings in the plates $B^5$. This allows the axle to incline in either direction, so that the wheels D upon it may both be always bearing upon the ground in spite of irregularities. The wheels are loose at the axle, but can be locked to it by clutches E, as in the other case.

At Fig. 3 is shown a train of gear suitable for giving motion to the digging mechanism and driving-wheels.

a is the crank-shaft of a steam-engine. At one end it is geared with an intermediate shaft, b. At the other end it is geared with a vertical shaft, c, which, as shown at Fig. 1, drives the crank-shaft I J K, which gives motion to the digging-forks. The intermediate shaft, $b$, has on one end of it a large toothed wheel, $b'$, and on the other a small toothed wheel, $b^2$.

$d$ is a shaft parallel with the intermediate shaft, $b$. It has on it a toothed wheel, $d'$, which can be geared with the small toothed wheel $b^2$ on the shaft $b$; or the wheel $b^2$ can be taken off this shaft, and a small wheel, $d^2$, fixed in the shaft $d$ to gear with the wheel $b'$ on the shaft $b$. In this way the shaft $d$ can be driven at either of two speeds, as desired. The shaft $d$, by a bevel-wheel upon it, drives a bevel-wheel fast upon the top of the vertical axis H, as seen at Fig. 3. The shaft also is seen at Figs. 5 and 6. The details of the digging mechanism are best seen at Figs. 1, 3, and 4, and in the larger views of some of the parts at Figs. 8, 9, and 10. R is a wooden lever-arm strengthened by wrought-iron plate and angle-irons bolted to it. To the lower end of the arm R is fixed a horizontal bar, Q, (see Figs. 1, 3, and 4,) to which numerous spades or prongs, P, are secured. The crank-pins S (see Figs. 1, 3, and 4) of the crank-shaft I J K are passed through the arms R at a point intermediate of their length. At the upper ends the arms have pivoted to them a block, U, as shown at Figs. 8, 9, and 10. Into the block U screws a hollow screw-bolt, Z. Through the hollow bolt passes a rod, V, secured to an axis, W, which can turn in bearings carried by the plates $B^3$. (See Figs. 3.) Y Y are coiled springs upon the rod V, one bearing against either end of the hollow bolt Z. The opposite ends of the springs bear against nuts screwed onto the rod V. Z' is a stop to prevent the outer spring being too much compressed.

What I claim is—

1. The combination, substantially as hereinbefore set forth, of the boiler, the pivoted carriages at the ends of the boiler, the wheels, their horizontal axles, and means for connecting and disconnecting the axles, whereby the axles may be held in line when the machine is to be propelled broadside, and be given a quarter-turn when the machine is to be moved endwise, as set forth.

2. The combination of the carriages, their vertical pivots, the two pairs of wheels D D, their horizontal axles, and the universally-jointed coupling detachably connecting the axles, substantially as and for the purpose hereinbefore set forth.

3. The combination, substantially as hereinbefore set forth, of the boiler, the pivoted end carriages, the two pairs of wheels, the two horizontal axles supported by the carriages, and upon which the wheels are loosely mounted, means for connecting and disconnecting the axles, and means for clutching the wheels with and unclutching them from their axles, for the purpose described.

4. The combination, in a steam digging-machine, of the pivoted end carriages, the crank-axis composed of three detachably coupled parts carried respectively by the locking-carriages and the body or central part of the machine, the three sets of digging-tools respectively actuated by the respective parts of the crank-axis, the two pairs of wheels, their axles mounted in the end carriages, and means for detachably connecting said axles, substantially as and for the purpose hereinbefore set forth.

5. The combination of the boiler, the pivoted end carriages, the two pairs of wheels, their axles mounted in the end carriages, the digging-tools at one side of the machine and extending lengthwise thereof, the jointed or folding arm projecting from the opposite side of the machine, means for rendering said arm rigid, and the wheel or wheels carried by the arm, substantially as and for the purpose hereinbefore set forth.

6. The combination of a set of digging-tools, their lever, the crank-pin passing through the lever intermediate its ends, the threaded block pivoted to the forked end of the lever, the hollow screw-bolt passing through the block, the turning rod passing through the screw-bolt, the two coiled springs on the turning rod at opposite ends of the hollow screw-bolt, and a stop for preventing too great compression of the outer spring, substantially as and for the purpose hereinbefore set forth.

T. C. DARBY.

Witnesses:
CHAS. BERKLEY HARRIS,
JOHN DEAN,
Both of 17 Gracechurch Street, London.